(12) United States Patent
Linares Rivas et al.

(10) Patent No.: US 10,096,343 B1
(45) Date of Patent: Oct. 9, 2018

(54) SHOCK ABSORBING BRACKET ASSEMBLY FOR STORAGE MEDIA DEVICE

(71) Applicant: ARRIS Enterprises LLC, Suwanee, GA (US)

(72) Inventors: Oswaldo Enrique Linares Rivas, Guadalupe (MX); Julio Cesar Ayala Vera, Apodaca (MX); Sergio Antonio Delon Canseco, Guadalupe (MX); Luis Lopez Moreno, Apodaca (MX); Carlos Gonzalez Inda, Guadalupe (MX)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/660,331

(22) Filed: Jul. 26, 2017

(51) Int. Cl.
*F16M 13/00* (2006.01)
*G11B 33/08* (2006.01)
*G11B 33/02* (2006.01)
*G11B 33/12* (2006.01)

(52) U.S. Cl.
CPC ............ *G11B 33/08* (2013.01); *G11B 33/027* (2013.01); *G11B 33/124* (2013.01)

(58) Field of Classification Search
USPC ......................................................... 248/636
See application file for complete search history.

(56) References Cited

U.S. PATENT DOCUMENTS

| 4,705,257 | A | * | 11/1987 | Leo | F16F 7/00 248/201 |
| 4,713,714 | A | * | 12/1987 | Gatti | G11B 33/08 248/581 |
| 4,937,806 | A | * | 6/1990 | Babson | G11B 33/025 360/137 |
| 5,673,171 | A | * | 9/1997 | Varghese | G11B 33/08 248/615 |
| 5,751,551 | A | | 5/1998 | Hileman et al. | |
| 5,858,509 | A | * | 1/1999 | Polch | G11B 33/08 181/207 |
| 6,002,588 | A | * | 12/1999 | Vos | F16F 7/14 174/138 G |
| 6,097,608 | A | * | 8/2000 | Berberich | G11B 33/08 248/560 |
| 6,196,516 | B1 | * | 3/2001 | Lan | G06F 1/184 248/615 |
| 6,319,116 | B1 | * | 11/2001 | Behl | G11B 33/02 361/753 |
| 6,498,722 | B1 | | 12/2002 | Stolz et al. | |
| 6,565,163 | B2 | * | 5/2003 | Behl | G11B 25/043 312/223.1 |
| 6,809,916 | B2 | * | 10/2004 | Nakata | F16F 1/025 361/115 |

(Continued)

FOREIGN PATENT DOCUMENTS

CN 202991989 U * 6/2013

*Primary Examiner* — Monica E Millner
(74) *Attorney, Agent, or Firm* — Larry T. Cullen

(57) ABSTRACT

The invention provides improved mounting apparatus for storage media device with respect to a chassis such as the housing of a broadcast data receiver. The bracket assembly including first and second parts which include a portion with a shock absorbing configuration so as to provide resilience to shock and vibrations while allowing improvements in the reduction of the assembly time and cost of the apparatus.

14 Claims, 7 Drawing Sheets

(56) References Cited

U.S. PATENT DOCUMENTS

| | | | | |
|---|---|---|---|---|
| 7,126,817 B2* | 10/2006 | Li | ............... | G06F 1/184 |
| | | | | 312/223.2 |
| 7,221,565 B2* | 5/2007 | Ko | ............... | G11B 33/08 |
| | | | | 174/5 SG |
| 7,486,509 B2* | 2/2009 | Kim | ............... | G06F 1/187 |
| | | | | 248/300 |
| 7,583,497 B2* | 9/2009 | Roesner | ............... | G06F 1/184 |
| | | | | 361/679.33 |
| 7,639,490 B2 | 12/2009 | Qin et al. | | |
| 7,839,639 B2* | 11/2010 | Najbert | ............... | F04D 29/601 |
| | | | | 361/679.36 |
| 8,040,670 B2* | 10/2011 | Tatsukami | ............... | G06F 1/1616 |
| | | | | 211/26 |
| 8,264,833 B2 | 9/2012 | Fang et al. | | |
| 8,582,287 B2* | 11/2013 | Nguyen | ............... | G11B 33/124 |
| | | | | 211/126.6 |
| 8,705,201 B2* | 4/2014 | Casey | ............... | G11B 33/08 |
| | | | | 360/97.12 |
| 8,833,510 B2* | 9/2014 | Koh | ............... | F16F 15/02 |
| | | | | 181/207 |
| 8,908,327 B1* | 12/2014 | Li | ............... | G11B 33/124 |
| | | | | 360/99.17 |
| 9,520,158 B1* | 12/2016 | Lyu | ............... | G11B 33/124 |
| 2002/0006030 A1* | 1/2002 | Evanson | ............... | G11B 15/6825 |
| | | | | 361/724 |
| 2005/0088778 A1* | 4/2005 | Chen | ............... | G06F 1/184 |
| | | | | 360/97.19 |

\* cited by examiner

SHOCK ABSORBING BRACKET ASSEMBLY FOR STORAGE MEDIA DEVICE

BACKGROUND

The invention to which this application relates to reducing the effect of impact and/or vibration of the chassis on the storage media device during transport and/or subsequent use.

Conventional mounting systems to hold a storage media device in the form of a hard disk drive (HDD) on a chassis typically require a metal bracket which is mounted directly on the chassis and grommets are provided which act as the interface between the chassis and the HDD. The grommets may take the form of rubber or other deformable material and are used to absorb the vibration and shock which may occur during transport and/or subsequent use of the apparatus. Fastening equipment in the form of screws are provided to hold the HDD on the bracket.

Typically the HDD is first required to be located on the bracket with the grommets and then the bracket and HDD assembly is attached to the chassis. This apparatus and method requires a number of assembly steps to be performed in order to mount the HDD on the chassis and so represents a significant assembly time and cost to the manufacturer.

U.S. Pat. No. 5,751,551A discloses a bracket for an electronic memory card that is inserted into a slot in a chassis which has a pair of opposing walls with guide channels that guide the card into position. Attached to the guide channels are a pair of grommet dampers which are pressed between the edges of the card and the guide channels and so the grommet dampers damp any shock or vibrational load that is transferred from the chassis. In U.S. Pat. No. 8,264,833B2 there is disclosed another system in which there are provided guide rails for the reception of the storage media device.

U.S. Pat. No. 6,498,722B1 includes a bracket attached to a computer component and a number of isolators are attached to posts extending from the bracket. A socket bracket is attached to the isolators and to the structure of the computer. An opening in the isolators fits over, onto, or around the posts of the post bracket and outer surfaces of the isolators fit within receptacles of the socket bracket so that the damping effect is related directly with the geometry of the component.

U.S. Pat. No. 7,639,490B2 refers to a bracket with a frame slidably received in the bracket. A fixing member is mounted inside the frame for fixing a storage device to the frame and at least one gasket to dampen vibrations transmitted from the frame to the storage device along the at least one fastener and the fixing member. Once again, this requires that there are several steps required to assemble the HDD on the chassis and it is necessary for an extra component to provide the dampening effect.

SUMMARY

In a first aspect of the invention, an apparatus is provided to mount at least one storage media device within a chassis, the apparatus having at least a first and second part configured to engage with the storage media device and wherein said parts incorporate a shock absorbing configuration to mitigate the effect of the shock or impact on the storage media device when installed in the chassis with the said apparatus. One embodiment of said apparatus locates the storage media device between the first and second engagement units.

The shock absorbing material is preferably embodied as a sheet of deformable material. In further embodiments, the shock absorbing material can have a mesh structure or can be composed of a perforated material.

Typically, the first and second parts are provided on opposing sides of, and locate with opposing sides of the storage media device. The first and second engagement units can include securing means allowing the apparatus to be secured within the chassis. The shock absorbing material is preferably located between means securing the apparatus to the chassis and the means engaging with the media storage device.

In one embodiment, the storage media device is a Hard Disk Drive (HDD) and reference to the same should not be taken to limit the scope of the invention.

Specific embodiments of the invention are now described with reference to the accompanying drawings.

BRIEF SUMMARY OF THE DRAWINGS

FIG. 6 illustrates the mounting apparatus and storage media device in location on the chassis base from parallel to the base and showing the storage media device end-on.

DETAILED DESCRIPTION

An aim of the present invention is to improve the installation of a storage media device by providing a form of an apparatus which provides protection from excessive vibration and shock to the storage media device while, at the same time, allowing the steps and time for the assembly of the bracket assembly, and the fitting of the storage media device with the bracket assembly, to be reduced.

Figure 1A:
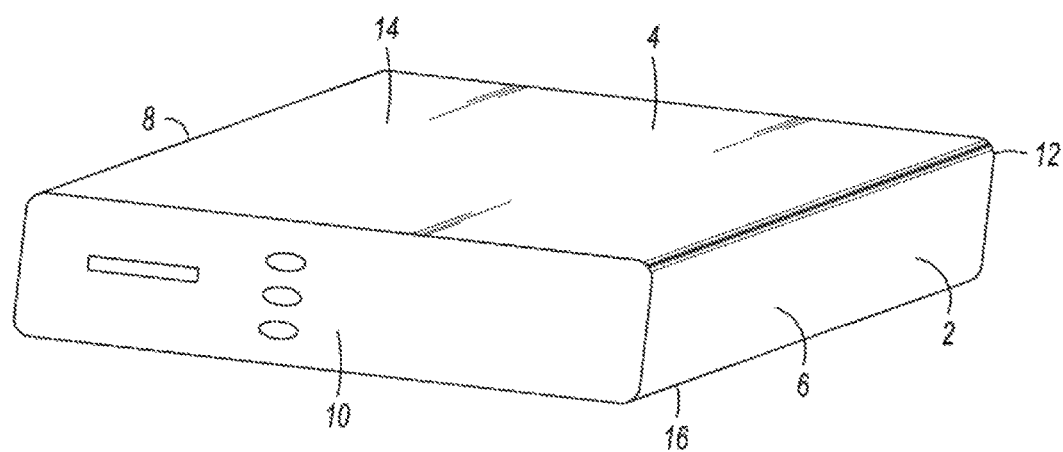
FIG. 1A illustrates schematically, a set top box with which the invention as herein described can be utilized.

Referring to FIG. 1A, there is illustrated a set-top box 2, also referred to as a broadcast data receiver, of a type with which the current invention can be utilized.

Figure 1B:
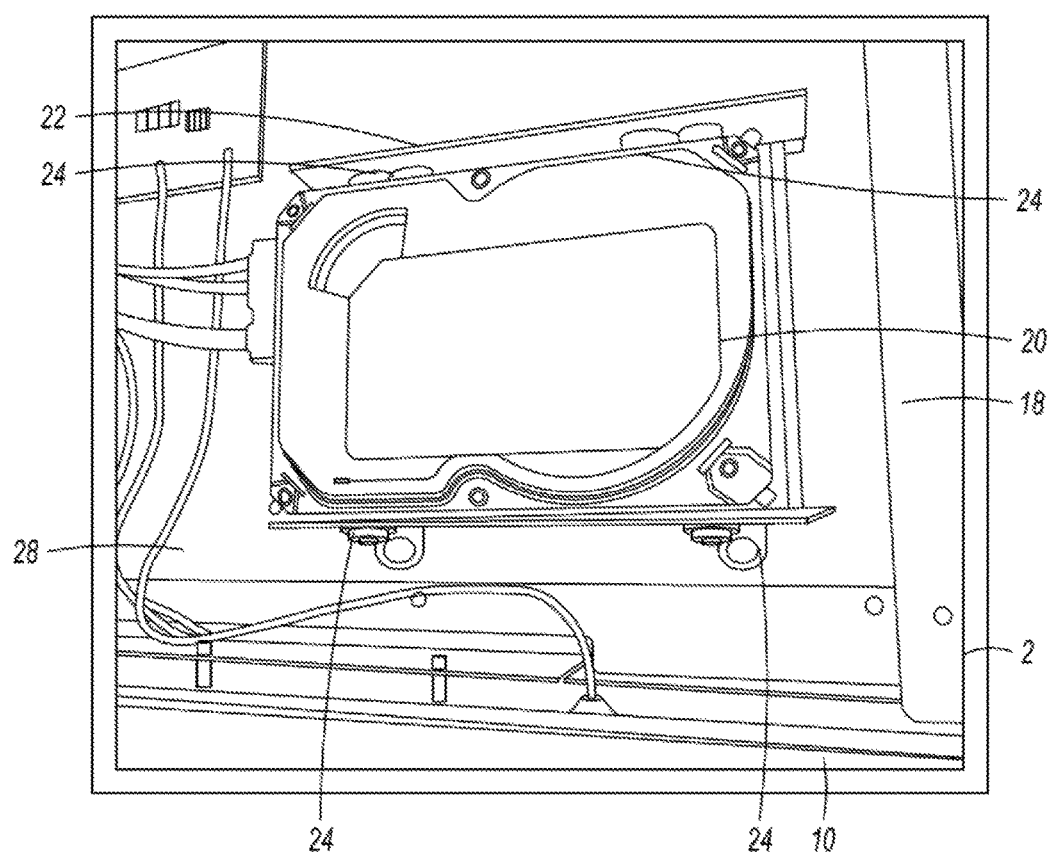
FIG. 1B illustrates a conventional fitting arrangement for a storage media device in the form of a HDD with the type of apparatus shown in FIG. 1A.

As shown in FIG. 1A, the set-top box includes a top surface 4, side walls 6, 8, a front and rear wall 10, 12 and a top 14 and a bottom or base 16. These define a cavity 18 as shown in FIG. 1B, with the bottom 16 or top 14 having been removed to show the interior of the cavity. Within the cavity processing components and storage media device 20 are provides. In this example storage media device 20 is in the form of a Hard Disk Drive (HDD) provided to selectively store data representative of television or radio programs which have been selected by a user of the device 2 to be stored and viewed at a later time after the scheduled showing of the same.

As shown in FIG. 1B, the HDD 20 is conventionally located in the cavity on a bracket 22 to which the same is secured using screws with deformable grommets 24 at spaced locations. The bracket is then located, with the HDD 20 in position, on an interior chassis 28 of the cavity 18. This form of assembly is time consuming to assemble and can be expensive due to the components which are required to be used.

Figure 2:
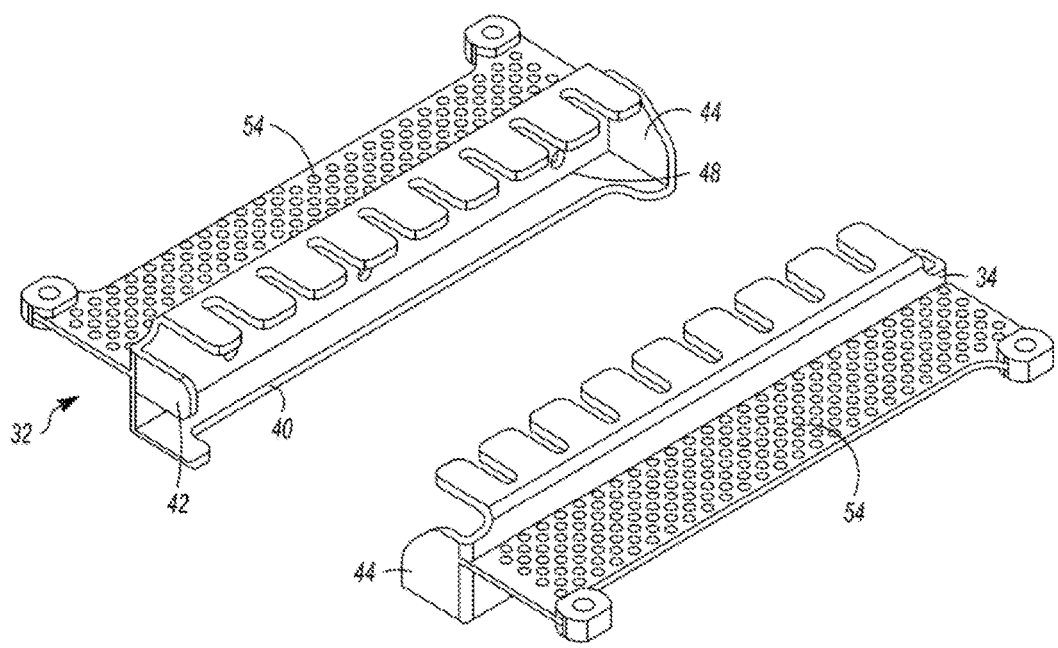
FIG. 2 illustrates first and second parts of the bracket assembly of the apparatus in accordance with one embodiment of the invention.
Figure 3:
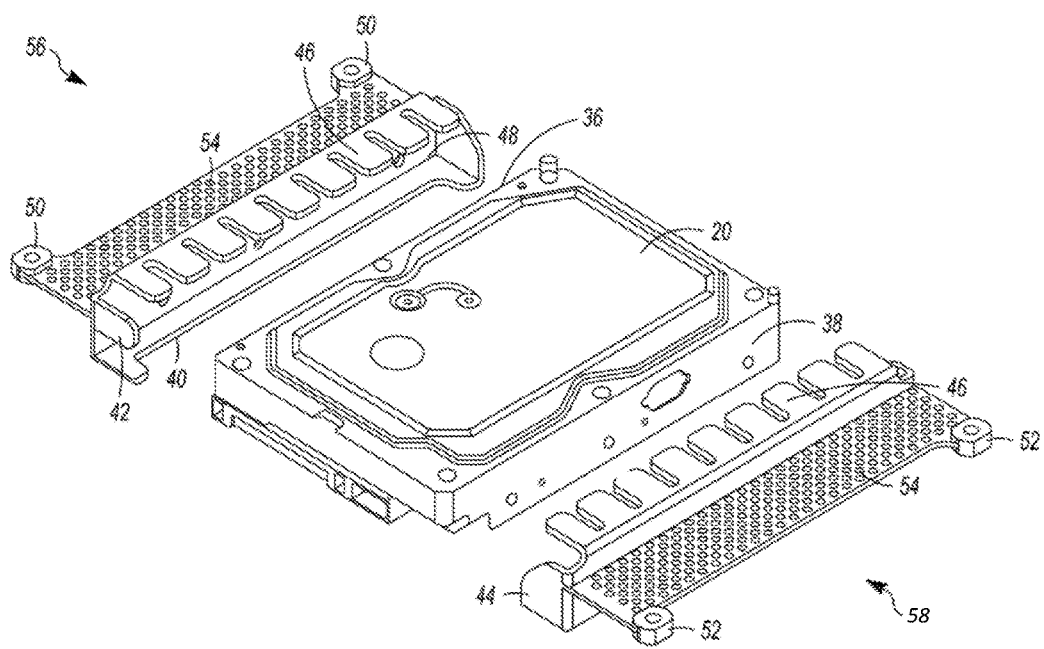
FIG. 3 illustrates the parts of FIG. 2 in conjunction with a storage media device which is to be located therewith.

Referring to FIG. 2, in accordance with the principles of the invention, there is shown, in FIG. 2, first and second engagement units 32, 34 of a bracket apparatus in accordance with the invention and the bracket apparatus mounts the HDD 20 in location with the chassis. It will be seen that the units 32, 34, in this embodiment, are of the same shape and form and one part 32 is rotated 180 degrees with respect to the other part 34. These units 32, 34 are located on opposing sides 36, 38 of the HDD 20 as shown in FIG. 3. Each of the parts 32, 34 includes engagement means comprising a base skirt 40, side lugs 42, 44 and engagement fingers 46, which, in combination, define a recess 48 in which a side 36, 38 of the HDD which is adjacent to that part, is located. It should be appreciated that the height, length and depth of the recess 48 will be formed with regard to the known dimensions of the particular HDD 20 which is to be located thereby.

Each engagement unit also includes securing means 50, 52 at the opposing edge from the recess 48 and, between the same is provided a shock and/or vibration absorbing configuration 54. In various embodiments, this shock absorbing configuration may be formed by a deformable material, with embodiments of a mesh configuration or perforated material as shown in FIG. 2. The deformable material has, firstly, sufficient flexibility and resilience to absorb shock and vibration within a predetermined range and, secondly, has sufficient resilience to return to an undeformed condition upon the absorption of the shock or vibration and thereby allow the HDD to be substantially maintained in its original location throughout. This therefore ensures that the operation of the HDD 20 can be maintained and is not damaged by shock and vibration which may be caused during transit or subsequent use of the apparatus.

Figure 4:
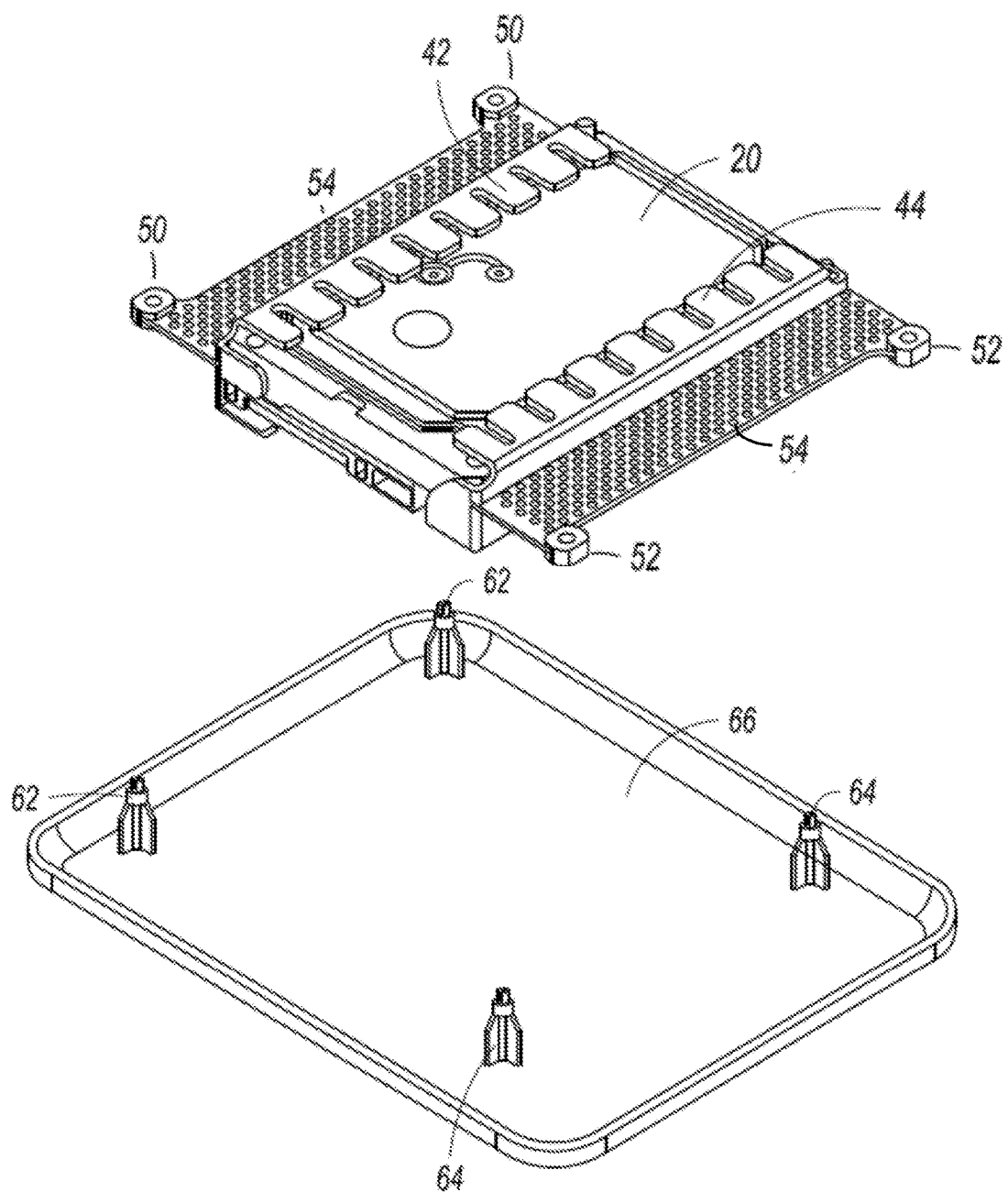
FIG. 4 illustrates the storage media device located with the mounting apparatus prior to location on a base of the chassis of the receiver of FIG. 1A.

To mount the HDD 20 with the chassis, the unit 42 is moved, as indicated by arrow 56 in FIG. 3 into engagement with the opposing edge 36 of the HDD to reach the mounting position shown in FIG. 4. Similarly unit 44 is moved into engagement with edge 38 of HDD 20, as indicated by arrow 58.

With the HDD 20 then secured in position with the bracket apparatus units 42, 44 the same are moved as a module as shown in FIG. 4 so that the securing means 50, 52 engage with support means 62, 64 respectively. The support means 62, 64 can be attached to, or formed integrally with, the chassis base 66. In different embodiments, the securing means could be in the form of a snap-fit connection, or a fastener such as a screw or rivet could be used to affix the securing means 50, 52 to support means 62, 64 respectively. The support means 62, 64 are also provided of a form such that any shock is transmitted through the same to the securing means and then is dissipated by the vibration absorbing configuration portions 54 in the bracket assembly parts 42, 44 so that the same does not reach the HDD 20.

Figure 5:
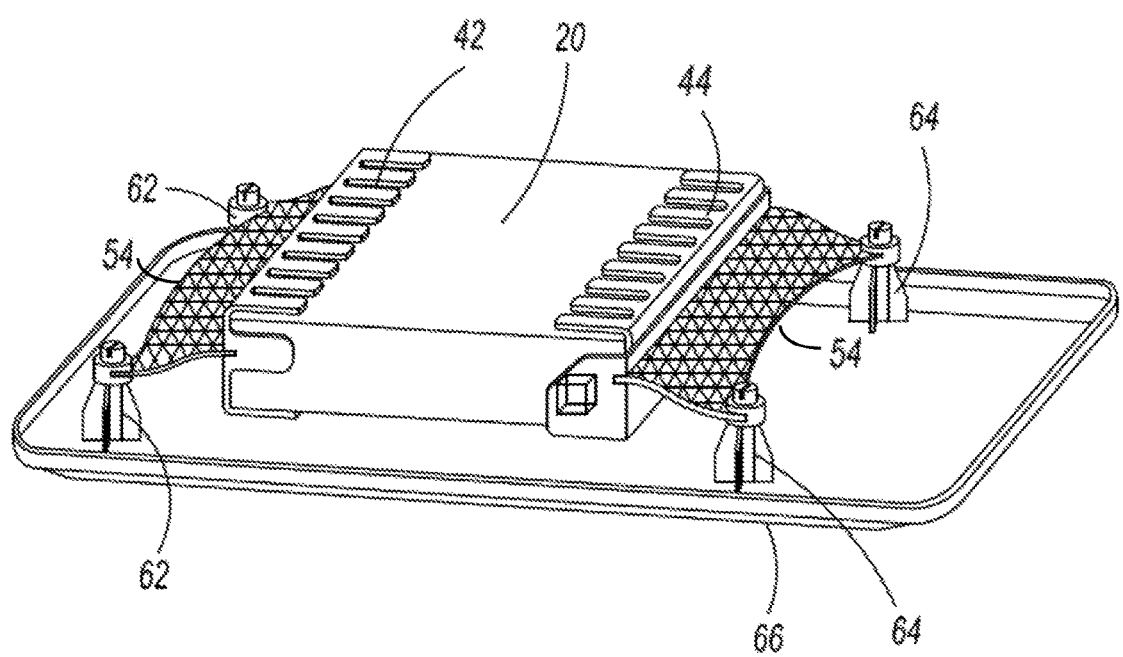
FIG. 5 illustrates dynamic/structural behavior of the storage media device located with the mounting apparatus in location on a base of the chassis of the receiver of FIG. 1A.

FIG. 5 illustrates the mounting apparatus and HDD 20 in location with the chassis 66 with an alternative vibration absorbing configuration portions 54 shown.

Figure 6:
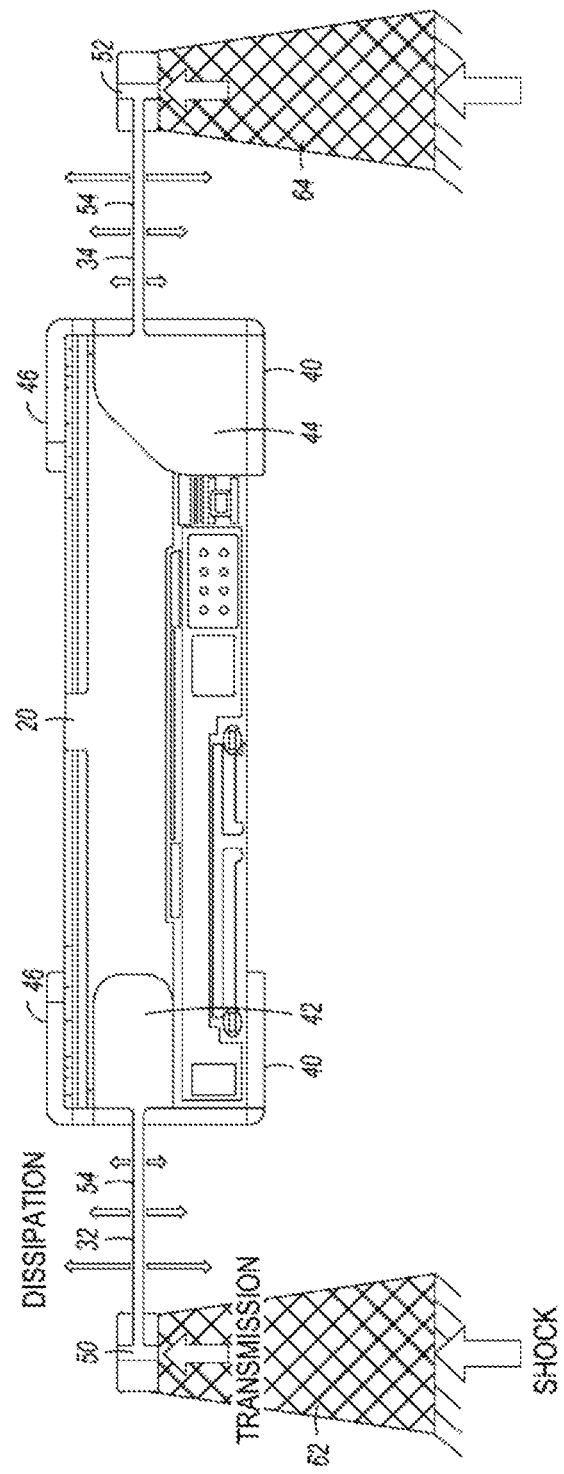

FIG. 6 illustrates a shock received by the base communicated through support member 62. The force is transmitted to point 50 through support member 62, but is then dissipated by the vibration absorbing configuration 54 as shown by the arrows of decreasing deflection. HDD 20 receives less energy from the shock because of the energy absorbed by configurations 54 and is less likely to be harmed.

The invention therefore provides improved bracket apparatus which utilises a reduced number of components, at least maintains the resilience to shock and vibrations and allows improvements in the reduction of the assembly time and cost.

In the drawings and specification, there have been disclosed embodiments of the invention and, although specific terms are employed, they are used in a generic and descriptive sense only and not for purposes of limitation, the scope of the invention being set forth in the following claims.

It is, of course, not possible to describe every conceivable combination of components or methodologies for purposes of describing the claimed subject matter, but one of ordinary skill in the art can recognize that further combinations and permutations of such matter are possible. Accordingly, the claimed subject matter is intended to embrace all such alterations, modifications and variations that fall within the spirit and scope of the appended claims.

It will be appreciated by those skilled in the relevant art that various attachment mechanisms and materials may be utilized to make and use the embodiments described herein. Various materials possessing sufficient flexibility and strength to embody the flexible connecting material may also be utilized to make and use the embodiments described herein.

What is claimed as new and desired to be protected by Letters Patent of the United States is:

1. An apparatus for mounting a storage media device on a chassis comprising:
   a first engagement unit having a first electronics attachment portion configured to engage with a first portion of the storage media device, a first chassis attachment portion configured to attach to the chassis, and a first flexible sheet connected to the first electronics attachment portion at a first planar end and connected to the first chassis attachment portion at another planar end opposite to the first planar end;
   a second engagement unit having a second electronics attachment portion configured to engage with a second portion of the storage media device, a second chassis attachment portion configured to attach to the chassis, and a second flexible sheet connected to the second electronics attachment portion at a first planar end and connected to the second chassis attachment portion at another planar end opposite to the first planar end,
   wherein the said first flexible sheet and second flexible sheet incorporate a shock absorbing configuration to thereby mitigate effects of a shock or impact on the storage media device.

2. Apparatus according to claim 1 wherein the first and second engagement units locate the component therebetween.

3. Apparatus according to claim 1 wherein the shock absorbing configuration comprises a sheet of deformable material.

4. Apparatus according to claim 1 wherein the shock absorbing configuration comprises a mesh structure.

5. Apparatus according to claim 1 wherein the shock absorbing configuration comprises a perforated material.

6. Apparatus according to claim 1 wherein the first and second engagement units are provided on opposing sides of, and locate with opposing sides of, the storage media device.

7. Apparatus according to claim 1 wherein at least one of the first chassis attachment portion and the second chassis attachment portion are provided so as to be selectively located with a support member which is engaged with or formed integrally with the chassis.

8. Apparatus according to claim 1 wherein the storage media device is a hard disk drive (HDD).

9. An apparatus for mounting a storage media device on a chassis comprising:
  an electronics attachment portion configured to engage with a first portion of the storage media device;
  a chassis attachment portion configured to attach to the chassis; and
  a flexible sheet connected to the electronics attachment portion at a first planar end and connected to the chassis attachment portion at another planar end opposite to the first planar end,
  wherein the said flexible sheet incorporate a shock absorbing configuration to thereby mitigate effects of a shock or impact on the storage media device.

10. The apparatus of claim 9 wherein the shock absorbing configuration comprises a sheet of deformable material.

11. The apparatus of claim 9 wherein the shock absorbing configuration comprises a mesh structure.

12. The apparatus of claim 9 wherein the shock absorbing configuration comprises a perforated material.

13. The apparatus of claim 9 wherein the electronics attachment portion includes a cavity configured to engage with the storage media device.

14. The apparatus of claim 9 wherein the electronics attachment portion, chassis attachment portion and flexible sheet are formed as a unity structure.

* * * * *